Nov. 16, 1965     D. E. THODE     3,217,666
DOUGH ROLLING DEVICE
Filed July 1, 1963
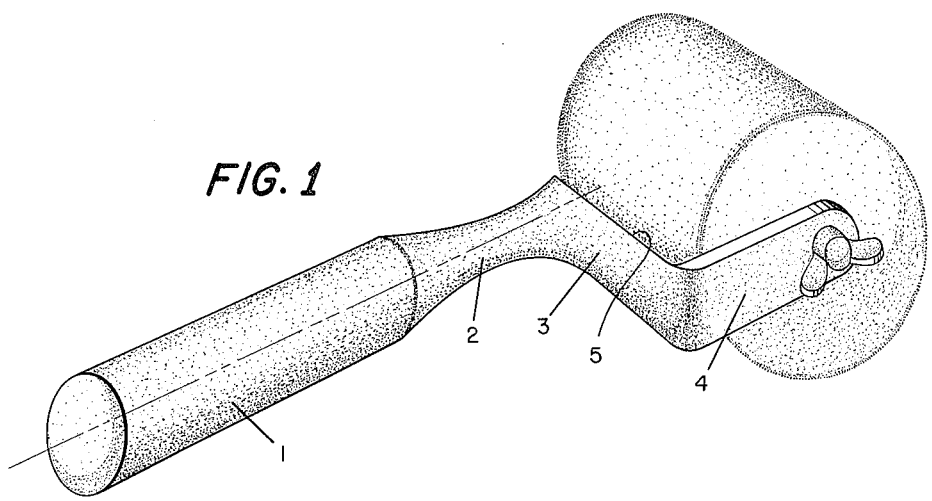
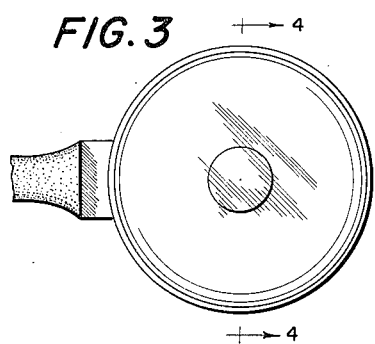
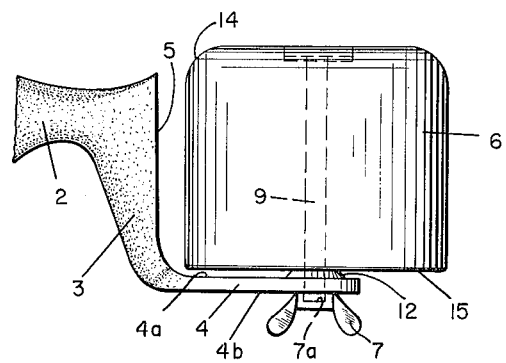
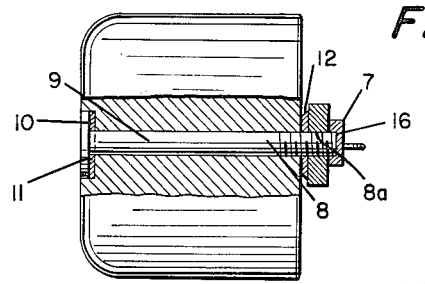
INVENTOR
DARLENE E. THODE
BY *Ralph J. Bassett*
ATTORNEY

United States Patent Office 3,217,666
Patented Nov. 16, 1965

3,217,666
DOUGH ROLLING DEVICE
Darlene E. Thode, Hales Corners, Wis.
(416 W. College Ave., Waukesha, Wis.)
Filed July 1, 1963, Ser. No. 291,693
2 Claims. (Cl. 107—50)

This invention relates to a dough rolling device for the complete formation by rolling of pie crusts, pizza, kuchen, cobblers, graham cracker pie crusts, cookies and tortes inside of a pan.

One of the objects of the invention is to provide a hand manipulated roller so constructed that crust material may be rolled inside of a pan and molded to conform to the pan shape regardless of the pan's design or structure.

More specifically, the present invention contemplates a handle having an offset roller-carrying arm for mounting a rotating roller thereon, the roller comprising a main cylindrical body terminating at one end portion in a general arcuate marginal structure and at the other end in a generally right angled structure, whereby the dough material can be pressed by a rolling operation into all portions of a pan structure to cause it to conform to the pan structure and to be properly molded therein.

Another object of the invention is to provide a device of the type described in which the roller is mounted on a removable pin bearing so that it can be readily removed, replaced or cleaned.

These and other objects of the invention will more clearly hereinafter appear by reference to the accompanying drawings forming a part of the instant specification and wherein like characters of reference designate corresponding parts throughout the several views, in which:

FIG. 1 is a perspective disclosure of the invention;

FIG. 2 is a top plan view of the invention with a portion of the handle removed;

FIG. 3 is an end elevation of the outer end of the roller; and

FIG. 4 is a transverse elevation, partly in section, showing the roller mounting structure.

An elongated handle structure 1 is provided with a reduced shank portion 2, a lateral extension 3 which tapers outwardly as shown in FIG. 2 to provide rigidity to this portion, and a forwardly projecting mounting arm 4. The inner face 5 of the lateral extension 3 is flat and lies at right angles to the longitudinal axis of the handle 1 and is of a length approximating the length of the cylindrical portion of the roller 6. The forwardly projecting supporting arm 4 has inner and outer flat surfaces, the inner flat face 4a lying parallel to the adjacent face of the roller and the outer surface providing a flat bearing for association with the thumb nut 7 received on the threaded extremity 8 of the roller pin 9 extending through the roller 6 and opening 8a in arm 4. The pin 9 is provided with a head 10 which is received in a socket 11 in the outer medial face of the roller. A washer 12 with a reduced inner face is interposed between the inner face of the arm 4 and the roller 6 to provide proper spacing of the roller and the arm and to facilitate the movement of the roller 6 on the mounting pin 9.

The roller 6 is of general cylindrical form with its outer end portion 14 formed with a substantially arcuate or inwardly curved surface which extends entirely about the periphery of the end portion and is uniform throughout, thus providing a rolling area which is capable of following any similarly contoured portion of a pan so that a dough composition in such pan area may be suitably compressed and molded thereover. The other or inner end of the roller 6, i.e. the end portion of the roller adjacent the supporting arm 4, has its outer periphery generally at right angles to the end portion 15 of the roller 6 so that this area can be used to apply pressure in angular portions which may be formed in a pan structure in which the device is to be used.

It is to be understood that the roller 6 is freely mounted on the pin 9, this movement being permitted by the axial opening in the roller through which the pin extends being slightly greater in diameter than the diameter of the pin. To prevent binding between the end 10 of the pin and the washer 12 positioned between the arm 4 and the adjacent surface of the roller 6, the thumb nut 7 is provided with a recess 16 which receives the threaded terminal of the mounting pin 9 and limits the movement of the pin within the thumb nut 7 to a predetermined number of turns on the threaded end of the pin. Thus the thumb nut cannot cause a binding between the pin head 10 and the washer 12 which would prevent rotation of the roller 6. In other words, the end wall 7a of the recess in the thumb nut 7 forms a stop to limit the movement of the thumb nut on the threaded extremity of the pin 9 to prevent a binding action on the roller.

The present device is designed for manipulation in the formation of pie crusts, pizza, kuchen, cobblers, tortes and cookies, as well as other doughs, and the rolling and preparation of these doughs inside of a pan regardless of the shape of the pan and with the use of either flour or grease on the roller and pan according to the consistency of the dough being used. Obviously, the use of the device eliminates pie rolling or crushing separate from the pan and the pressing by the fingers of the pie crust within the pan and keeps the entire formation of the pie crust and the formation of similar structures within the area of the pan itself.

The structure can be made of wood, plastic or any suitable metal. It will also be noted that the position of the axis of the handle and the relation of the extension 3 to the roller results in quick and accurate manipulation of the device to perform its many functions in the treatment of dough in a pan.

What I claim is:

1. In a roller for use in manipulating dough within a pan or similar structure, a handle member, an extension projecting from one end of the handle and laterally thereof with its outer surface lying in a plane transverse to the axis of the handle, a single supporting arm fixed to the outer end of said laterally projecting extension and extending forwardly thereof, said extension having its inner face lying parallel to the axis of said handle member and said arm being formed with an opening adjacent the outer end of said arm, a pin member extending through the opening in said arm and fixed thereto, a cylindrical roller mounted on said pin member, said roller having its end adjacent said arm flat and parallel to the inner face of said arm and its periphery at right angles thereto, the other end portion of said roller projecting outwardly beyond the inner end of said laterally projecting extension, and means for adjusting said roller on said pin to prevent binding action between the roller and the supporting arm, said entire outwardly projecting end portion of the roller being rounded to provide a contoured working surface.

2. The structure of claim 1 characterized in that the means for adjusting the roller to prevent binding action between the roller and the supporting arm is a thumb nut having a socket formed with an end wall against which the extremity of the pin member abuts.

References Cited by the Examiner
UNITED STATES PATENTS

| | | |
|---|---|---|
| 1,456,215 | 5/1923 | Brightman. |
| 2,368,513 | 1/1945 | Adams. |
| 2,652,774 | 9/1953 | Sprung _____ 15—230 X |
| 2,684,497 | 7/1954 | Graham _____ 15—230 X |
| 2,734,464 | 2/1956 | Hallock et al. _____ 107—50 |

ROBERT E. PULFREY, *Primary Examiner.*
CHARLES A. WILLMUTH, *Examiner.*